US012734937B2

(12) United States Patent
Taga et al.

(10) Patent No.: US 12,734,937 B2
(45) Date of Patent: Sep. 15, 2026

(54) VEHICLE SYSTEM

(71) Applicant: TOYOTA JIDOSHA KABUSHIKI KAISHA, Aichi-ken (JP)

(72) Inventors: Toko Taga, Toyota (JP); Yasuaki Iijima, Nagoya (JP); Moto Takabatake, Mountain View, CA (US)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 132 days.

(21) Appl. No.: 18/749,622

(22) Filed: Jun. 21, 2024

(65) Prior Publication Data

US 2025/0001905 A1 Jan. 2, 2025

(30) Foreign Application Priority Data

Jun. 30, 2023 (JP) ................................ 2023-108905

(51) Int. Cl.
*B60N 2/02* (2006.01)
*B60N 2/75* (2018.01)
*G06T 3/20* (2006.01)

(52) U.S. Cl.
CPC ............ *B60N 2/0233* (2023.08); *B60N 2/75* (2018.02); *G06T 3/20* (2013.01)

(58) Field of Classification Search
None
See application file for complete search history.

(56) References Cited

U.S. PATENT DOCUMENTS

| | | | | |
|---|---|---|---|---|
| 2009/0195659 | A1 | 8/2009 | Nagata et al. | |
| 2018/0170227 | A1 | 6/2018 | Shirota et al. | |
| 2019/0255949 | A1* | 8/2019 | Larin | F16H 59/08 |
| 2019/0278392 | A1* | 9/2019 | Satou | G06F 3/011 |
| 2022/0072983 | A1* | 3/2022 | Line | B60N 2/682 |
| 2024/0019929 | A1* | 1/2024 | Uhlig | B60K 35/22 |

FOREIGN PATENT DOCUMENTS

| | | | |
|---|---|---|---|
| JP | 2009-181423 | A | 8/2009 |
| JP | 2016-212682 | A | 12/2016 |
| JP | 2018-099976 | A | 6/2018 |
| JP | 2019089477 | A | 6/2019 |

* cited by examiner

*Primary Examiner* — Frank S Chen
(74) *Attorney, Agent, or Firm* — HAUPTMAN HAM, LLP

(57) ABSTRACT

A vehicle system, includes: a vehicle seat having a seat position that is changeable; a center console that extends in a vehicle front-rear direction; a display that is provided at an upper face of the center console; a memory; and a processor that is coupled to the memory, the processor is configured to: cause display, at the display, of an operation window that is configured to operate a vehicle electrical hardware; and change a display position of the operation window so as to follow a change in the seat position.

7 Claims, 8 Drawing Sheets

M
12B
12C
16(12)
40
52
54
50
42
X
15
12A
UP
FR

VEHICLE SYSTEM

CROSS-REFERENCE TO RELATED APPLICATION

This application is based on and claims priority under 35 USC 119 from Japanese Patent Application No. 2023-108905, filed on Jun. 30, 2023, the disclosure of which is incorporated by reference herein.

BACKGROUND

Technical Field

The present disclosure relates to a vehicle system of a vehicle that is installed with a center console.

Related Art

Japanese Patent Application Laid-Open (JP-A) No. 2016-212682 discloses a vehicle including a center console at which a touch panel for operating vehicle electronic devices is installed at the vehicle front side.

In recent years, autonomous driving technology for vehicles has been developed, and vehicle seats that are capable of long sliding with a larger amount of sliding in the vehicle front-rear direction have been provided so that an occupant can be seated with a relaxed posture during autonomous driving. However, as described in JP-A No. 2016-212682, due to a touch panel provided at a center console being provided at a position corresponding to operation at a seated position in which the vehicle can be driven, there is a possibility that the hand of an occupant does not reach the touch panel at a position in which a relaxed posture, in which the vehicle seat is slid toward the vehicle rear side, is possible.

SUMMARY

The present disclosure provides a vehicle system in which a seated occupant can operate an operation portion that is displayed at a display, regardless of a seat position of a vehicle seat.

A vehicle system according to a first aspect of the present disclosure includes: a vehicle seat having a seat position that is changeable; a center console that extends in a vehicle front-rear direction; a display that is provided at an upper face of the center console; a memory; and a processor that is coupled to the memory, the processor is configured to: cause display, at the display, of an operation window that is configured to operate a vehicle electrical hardware; and change a display position of the operation window so as to follow a change in the seat position.

In the vehicle system according to the first aspect of the present disclosure, the processor causes display, at the display provided at the upper face of the center console, of the operation window that is configured to operate a vehicle electronic hardware, and changes the display position of the operation window so as to follow a change in the seat position of the vehicle seat. Therefore, even if the seat position of the vehicle seat is changed, since the display position of the operation window at the display is changed following the change of the vehicle seat, a seated occupant can operate the operation window displayed at the display, regardless of the seat position of the vehicle seat.

A vehicle system according to a second aspect of the present disclosure has the configuration of the first aspect, wherein the seat position is changed due to a change in a seat location in the vehicle front-rear direction.

In the vehicle system according to the second aspect of the present disclosure, since the seat position is changed due to a change in the seat location in the vehicle front-rear direction, in a case in which the seat location of the vehicle seat in the vehicle front-rear direction is changed, the display position of the operation window at the display can be changed following the change in the seat location.

A vehicle system according to a third aspect of the present disclosure has the configuration of the first aspect or the second aspect, wherein the seat position is changed due to a change in a seat posture.

In the vehicle system according to the third aspect of the present disclosure, since the seat position is changed due to a change in the seat posture, in a case in which the seat posture of the vehicle seat is changed, the display position of the operation window at the display can be changed following the change in the seat posture.

A vehicle system according to a fourth aspect of the present disclosure has the configuration of any one of the first aspect to the third aspect, wherein the display is provided at an entirety of the upper face of the center console.

In the vehicle system according to the fourth aspect of the present disclosure, since the display is provided at the entirety of the upper face of the center console, the movement amount of the display position of the operation window at the display can be increased, and it is possible to accommodate a larger change in the seat position.

A vehicle system according to a fifth aspect of the present disclosure has the configuration of any one of the first aspect to the fourth aspect, wherein: the vehicle seat includes an armrest; and the operation window is arranged, at the upper face of the center console, at a position at which the operation window is operable by a finger of an occupant in a state in which an arm of the occupant is placed on the armrest.

In the vehicle system according to the fifth aspect of the present disclosure, since the operation window is arranged, at the upper face of the center console, at a position at which the operation window is operable by a finger of the occupant in a state in which an arm of the occupant is placed on the armrest, the occupant can operate the operation window in a state in which his/her arm is resting on the armrest.

A vehicle system according to a sixth aspect of the present disclosure has the configuration of the fifth aspect, wherein: the armrest is configured to move in the vehicle front-rear direction in accordance with a change in the seat position; and the processor is configured to move the display position of the operation window in the vehicle front-rear direction based on a movement amount of the armrest in the vehicle front-rear direction which accompanies the change in the seat position.

In a vehicle system according to the sixth aspect of the present disclosure, since the processor is configured to move the display position of the operation window in the vehicle front-rear direction based on a movement amount of the armrest in the vehicle front-rear direction which accompanies the change in the seat position, the occupant can operate the operation window in a state in which his/her arm is resting on the armrest, regardless of the seat position of the vehicle seat.

As explained above, the vehicle system according to the present disclosure has the effect of enabling a seated occupant to operate the operation window that is displayed at the display, regardless of the seat position of the vehicle seat.

BRIEF DESCRIPTION OF THE DRAWINGS

An exemplary embodiment of the present disclosure will be described in detail based on the following figures, wherein.

DETAILED DESCRIPTION

Explanation follows regarding a vehicle system 10 including a vehicle 10A according to an exemplary embodiment of the present disclosure, with reference to FIG. 1 to FIG. 8. Note that in the following explanation, reference to front-rear, left-right, and up-down directions refers to the front-rear, the left-right, and the up-down directions of the vehicle 10A. Further, it should be noted that in each of the drawings, as appropriate, the arrow FR indicates a frontward direction, the arrow UP indicates an upward direction, the arrow RH indicates a rightward direction, and the arrow LH indicates a leftward direction. In the following explanation, unless specifically stated otherwise, simple reference to the front-rear, up-down, and left-right directions refers to front and rear in a vehicle front-rear direction, up and down in a vehicle up-down direction, and left and right when facing the frontward direction.

Figure 1:
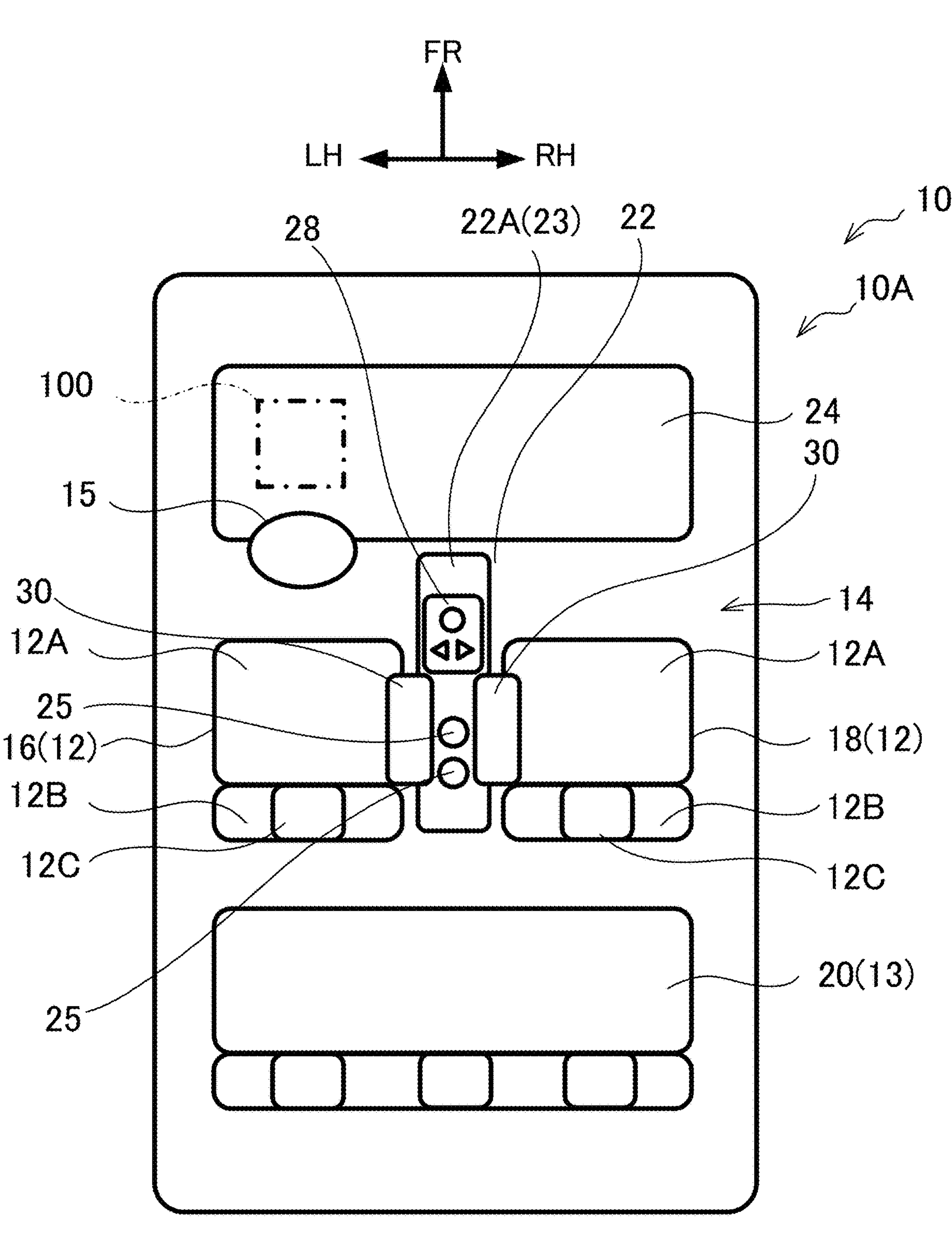
FIG. 1 is a plan view schematically illustrating a vehicle system according to an exemplary embodiment of the present disclosure.

As illustrated in FIG. 1, the vehicle system 10 of the present exemplary embodiment includes a vehicle 10A and a control section 100 serving as a display control section.

Configuration of Vehicle 10A

The vehicle 10A includes a driver's seat 16 and a front passenger seat 18, each configured by a vehicle seat 12 at which an occupant at an interior of a vehicle cabin 14 is seated, and a rear seat 20 configured by a vehicle seat 13. Note that in the vehicle 10A of the present exemplary embodiment, as an example, a steering wheel 15 is disposed at a left side of the interior of the vehicle cabin 14, the driver's seat 16 is disposed at the left side of the interior of the vehicle cabin 14, and the front passenger seat 18 is disposed at a right side of the driver's seat 16. Further, a center console 22 is provided between the driver's seat 16 and the front passenger seat 18, and a dashboard 24 is provided at a front side of the driver's seat 16 and the front passenger seat 18.

Figure 3:
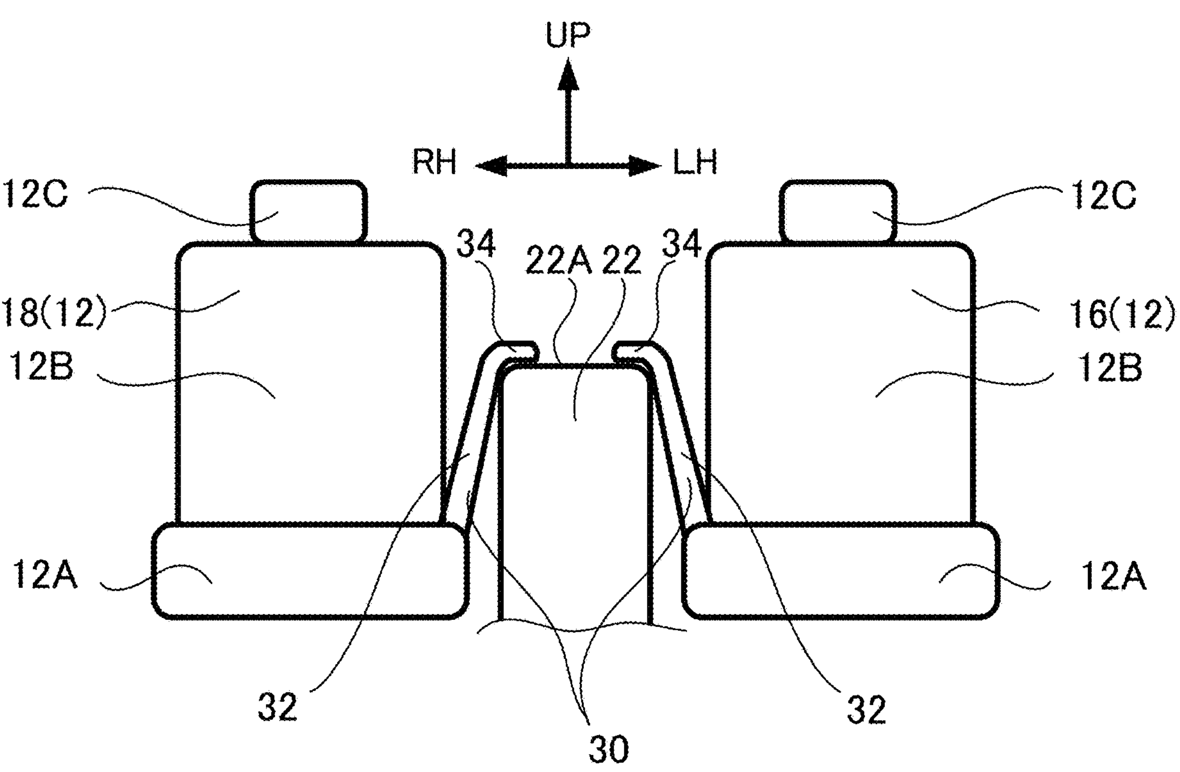
FIG. 3 is a front view, as seen from a seat front side, illustrating a main portion of the vehicle in FIG. 1.

As illustrated in FIG. 3, an upper face 22A of the center console 22 is positioned further toward a vehicle upper side than an occupant seating surface of a seat cushion 12A, which is described below. Further, as illustrated in FIG. 1, the center console 22 extends in the vehicle front-rear direction, and at the upper face 22A, as an example, two cup holders 25 and an operation portion (operation window) 28, which is capable of operating various vehicle electronic devices (not illustrated) installed at the vehicle 10A, are provided. Examples of the vehicle electronic devices include a car navigation system, an audio system, and a control device that controls driving of the vehicle 10A. In the present exemplary embodiment, as an example, the operation portion 28 is displayed at a display 23 configured with a touch panel type liquid crystal screen, and the display 23 is provided at an entirety of the upper face 22A of the center console 22. That is, the entirety of the upper face 22A of the center console 22 is formed with a liquid crystal screen, excluding the inside of the cup holders 25.

The rear seat 20 is provided at the rear of the driver's seat 16 and the front passenger seat 18, and, as an example, a bench type seat on which three occupants can be seated is employed as the vehicle seat 13 configuring the rear seat 20. Note that the vehicle seat 13 is not limited to a bench type seat, and independent vehicle seats 12 may be provided.

Figure 2:
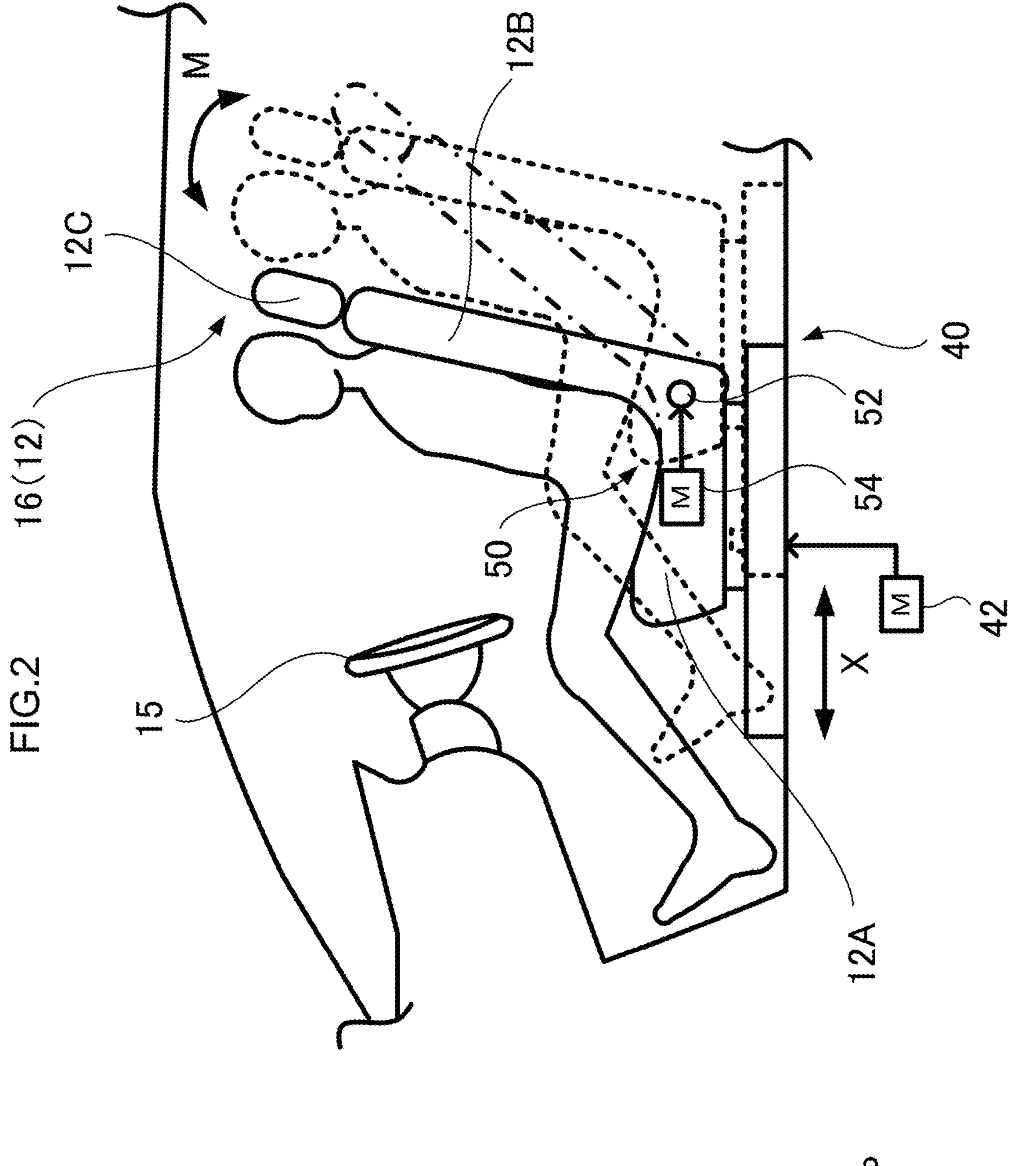
FIG. 2 is a side view illustrating part of the vehicle in FIG. 1.

As illustrated in FIG. 1 and FIG. 2, each vehicle seat 12 configuring the driver's seat 16 and the front passenger seat 18 includes a seat cushion 12A at which an occupant is seated, and a seatback 12B that is coupled to a rear end portion of the seat cushion 12A and that is capable of supporting a back portion of an occupant. Further, a headrest 12C that is capable of supporting the head of an occupant is provided at an upper end portion of the seatback 12B. Each vehicle seat 12 is provided with an armrest 30 at a center console 22 side. Note that in the respective drawings, as an example, an aspect in which the armrest 30 is provided only at the center console 22 side is illustrated; however, an armrest may also be provided at a vehicle width direction outer side.

The seat cushion 12A includes a frame that forms a skeleton of the seat cushion 12A, a cushion material that is formed of urethane foam, and a surface material that is made of cloth or leather and that covers a surface of the cushion material. A seat slide portion 40 that enables the seat cushion 12A to slide in the vehicle front-rear direction is provided at the vehicle seat 12.

Although not illustrated in the drawings, the seat slide portion 40 includes a seat rail that is fastened to a floor portion of the vehicle 10A, and an upper rail to which the vehicle seat 12 is attached and that is capable of sliding with respect to the seat rail. The seat rail and the upper rail are each configured by a left and right pair of rails extending in the vehicle front-rear direction. Further, the seat slide portion 40 includes a transmission shaft (not illustrated in the drawings) extending between a left and right pair of rails of the upper rail, and a sliding motor 42 that rotatably drives the transmission shaft, and rotational drive of the sliding motor 42 is controlled by the control section 100. The vehicle seat 12 attached to the upper rail slides in the vehicle front-rear direction (arrow X) based on driving force of the sliding motor 42 transmitted via the transmission shaft.

Note that in the present exemplary embodiment, a position sensor (not illustrated in the drawings) that detects a position of the vehicle seat 12 in the vehicle front-rear direction is provided, and the position sensor is a rotary encoder that detects a rotation position of an output shaft of the sliding motor 42. By detecting the rotation position of the output shaft of the sliding motor 42 using the position sensor, a sliding amount of the vehicle seat 12 in the vehicle front-rear direction can be indirectly detected. Note that electrical signals corresponding to the rotation position of the output shaft of the sliding motor 42, namely, the sliding amount of the vehicle seat 12, are output from the position sensor.

Although not illustrated in the drawings, a lift device that raises and lowers the seat cushion 12A in the vehicle up-down direction may be provided at the vehicle seat 12.

The seatback 12B includes a frame that forms a skeleton of the seatback 12B, a cushion material that is formed of urethane foam, and a surface material that is made of cloth or leather and that covers a surface of the cushion material. The seatback 12B includes a reclining portion 50 that rotates the seatback 12B in the vehicle front-rear direction about a vehicle lower end portion of the seatback 12B.

The reclining portion 50 is provided with a shaft portion 52. A center axis direction of the shaft portion 52 is a vehicle width direction, and a vehicle rear side portion of the frame of the seat cushion 12A and a vehicle lower side portion of the frame of the seatback 12B are mechanically coupled by the shaft portion 52. Further, the reclining portion 50 includes a reclining motor 54, and rotational drive of the reclining motor 54 is controlled by the control section 100.

The reclining motor 54 is provided, for example, at the seat cushion 12A. An output shaft of the reclining motor 54 is coupled to, for example, a gear train (not illustrated) serving as a reduction gear, or a driving force transmission device, which is provided at the shaft portion 52. The seatback 12B is rotated about the shaft portion 52 by driving force of the reclining motor 54. Therefore, the seatback 12B rotates in the vehicle front-rear direction (the arrow M direction in FIG. 2) about the shaft portion 52.

Note that in the present exemplary embodiment, a posture sensor (not illustrated in the drawings) that detects a reclining angle of the seatback 12B of the vehicle seat 12, namely, the posture of the seatback 12B, is provided, and the posture sensor is, for example, a rotary encoder that detects a rotation position of the output shaft of the reclining motor 54. As described above, the seatback 12B is rotated in the vehicle front-rear direction by the driving force of the reclining motor 54. This enables the rotation angle, namely, the posture of the seatback 12B in the vehicle front-rear direction, to be indirectly detected by detecting the rotation position of the output shaft of the reclining motor 54. Note that electrical signals corresponding to the rotation position of the output shaft of the reclining motor 54, namely, the rotation angle (posture) of the seatback 12B, are output from the posture sensor.

In the present exemplary embodiment, as an example, a seat position is changed due to a change in a seat location by sliding the seat cushion 12A in the vehicle front-rear direction by the seat slide portion 40.

The headrest 12C is provided at an end portion at a seat upper side of the seatback 12B. The headrest 12C includes a cushion material that is formed of urethane foam, and a surface material that is made of cloth or leather and that covers a surface of the cushion material.

As an example, the armrest 30 includes a frame that forms a skeleton of the armrest 30, a cushion material that is formed of urethane foam, and a surface material that is made of cloth or leather and that covers a surface of the cushion material. Note that the armrest 30 may be covered with a molding, which is a design component made of resin or the like, around the frame.

Figure 4:
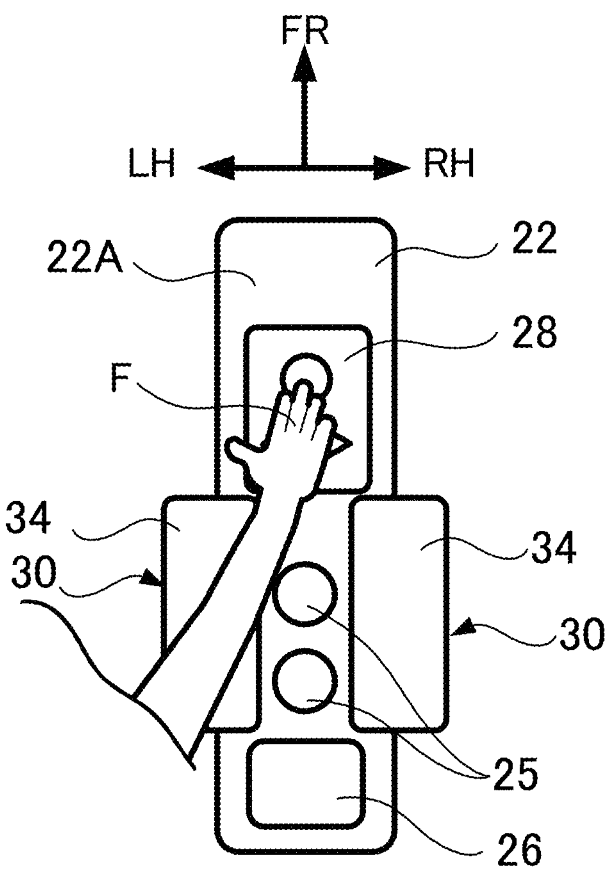
FIG. 4 is a plan view, as seen from a seat upper side, illustrating a main portion of FIG. 3.

As illustrated in FIG. 3, as an example, the armrest 30 is formed in an inverted L-shape when viewed from the seat front side. A lower end portion 32 of the armrest 30 extends toward the upper face 22A of the center console 22 from a center console 22 side of the seat cushion 12A. Further, an upper end portion 34 of the armrest 30 extends substantially horizontally from an upper end of the lower end portion 32 toward the center console 22 side, and as illustrated in FIG. 4, at least part of the upper end portion 34 is disposed so as to overlap with the upper face 22A of the center console 22 in plan view.

In the present exemplary embodiment, as an example, the upper end portions 34 of the armrest 30 are each disposed so as to overlap with approximately ¼ of the vehicle width direction of the upper face 22A of the center console 22, and are disposed such that the cup holders 25 are exposed. Further, as illustrated in FIG. 4, in the present exemplary embodiment, the operation portion 28 is disposed at a position that can be operated by a finger F of the occupant in a state in which the occupant rests his/her arm on the armrest 30.

As an example, the armrest 30 is integrally formed with the seat cushion 12A. Specifically, for example, a frame that forms a skeleton of the armrest 30 is formed extending from the frame that forms the skeleton of the seat cushion 12A.

Figure 5:
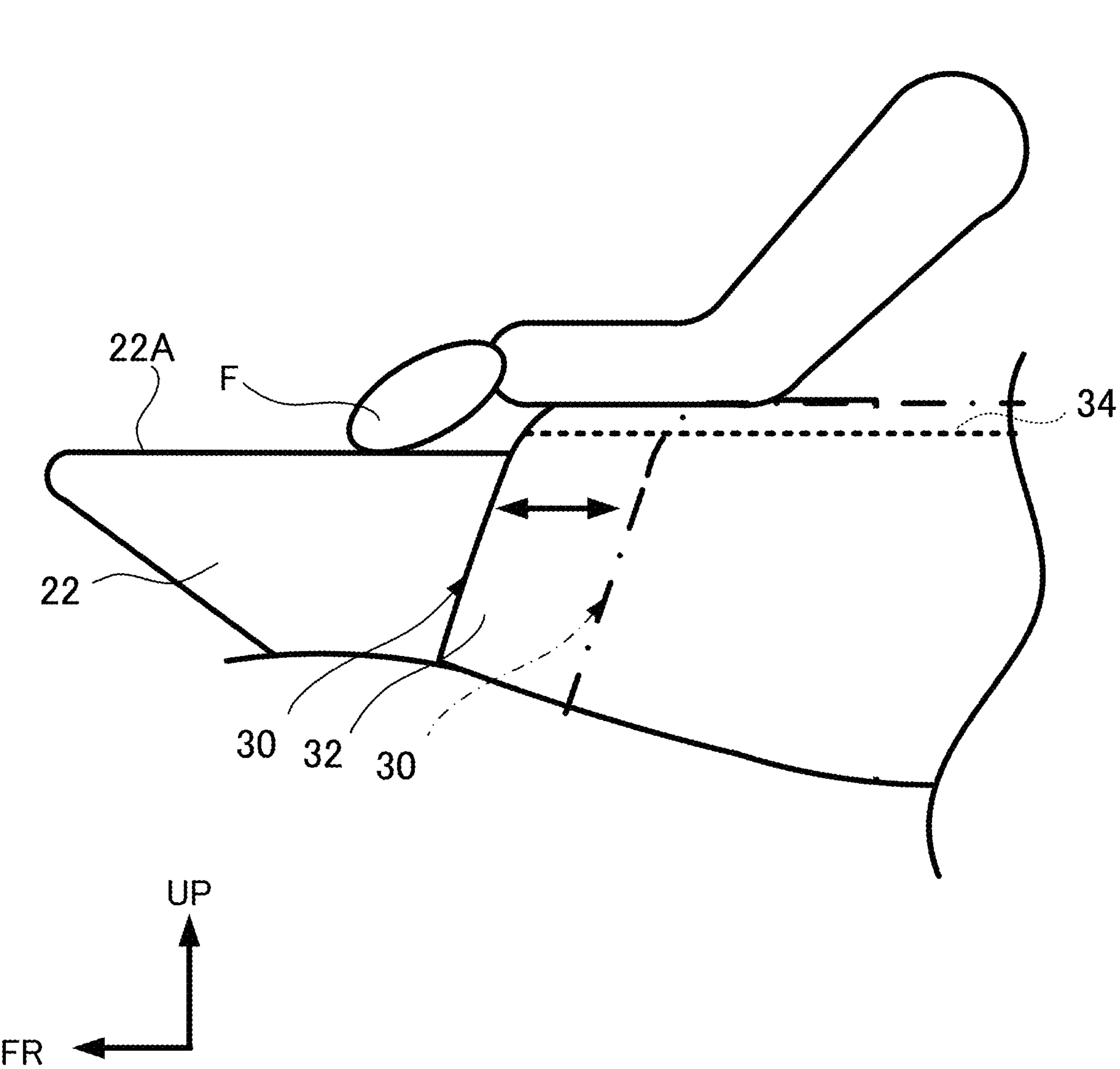
FIG. 5 is a side view, as seen from a seat left side, illustrating a main portion of the vehicle in FIG. 1.
Figure 6:
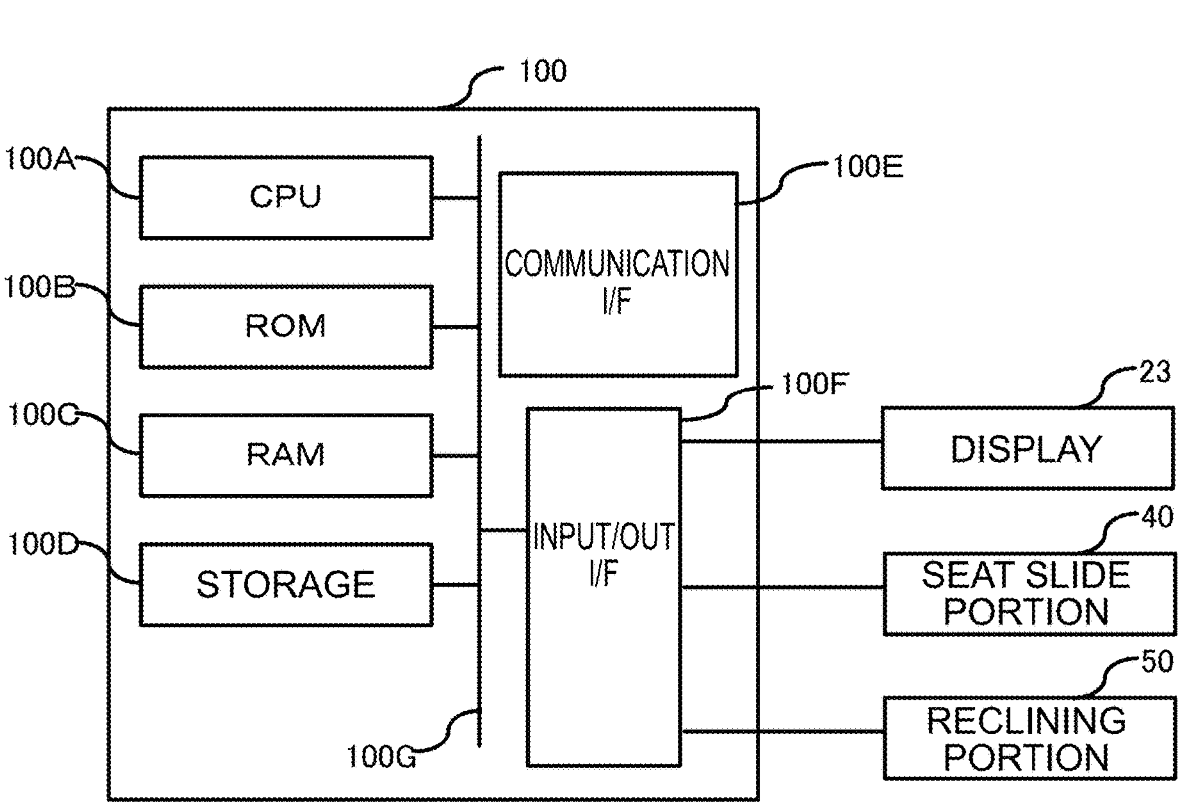
FIG. 6 is a block diagram illustrating a configuration of a vehicle system according to an exemplary embodiment of the present disclosure.

Further, as illustrated in FIG. 5, the armrest 30 is disposed at a height position at which the operation portion 28 can be operated by the finger F of the occupant, in a state in which the occupant rests his/her arm on the upper end portion 34 of the armrest 30. Note that in the present exemplary embodiment, the armrest 30 is integrally formed with the seat cushion 12A, such that in a case in which the vehicle seat 12 is moved in the vehicle front-rear direction by the seat slide portion 40 as described above, the armrest 30 is also moved in the vehicle front-rear direction together with the seat cushion 12A.

Namely, as illustrated in FIG. 5, the armrest 30 is movable along the upper face 22A of the center console 22 in the vehicle front-rear direction, and is moved from a position of the armrest 30 illustrated by a solid line to a position of the armrest 30 illustrated by a dash-dot line, for example, by moving rearward together with movement of the vehicle seat 12. Note that in the present exemplary embodiment, in order to enable the armrest 30 to move smoothly along the upper face 22A of the center console 22, a gap that is sufficient to enable an occupant to maintain a height position at which the operation portion 28 can be operated by the finger F of the occupant in a state in which his/her arm is resting on the upper end portion 34 of the armrest 30 is provided between the upper face 22A of the center console 22 and the lower face of the upper end portion 34 of the armrest 30.

Configuration of Control Section 100

The control section 100 of the present exemplary embodiment controls overall travel of the vehicle 10A, as well as vehicle electronic devices (vehicle electrical hardware) such as a car navigation system, an audio system, and a control device that controls driving of the vehicle 10A, for example. Further, the control section 100 also functions as a display control section that controls display of the display 23.

The control section 100 includes a central processing unit (CPU; serving as a processor, the processor is a hardware circuit) 100A, read only memory (ROM) 100B, random access memory (RAM) 100C, storage 100D, a communication interface (communication I/F) 100E, and an input/output interface (input/output I/F) 100F that performs communication and the like with external devices. The CPU 100A, the ROM 100B, the RAM 100C, the storage 100D, the communication I/F 100E, and the input/output I/F 100F are communicably connected to each other via a bus 100G. Further, the display 23, the seat slide portion 40, the reclining portion 50, and the like are connected to the input/output I/F 100F.

The CPU 100A is a central processing unit that executes various programs, controls rotational drive of the sliding motor 42 of the seat slide portion 40 and the reclining motor 54 of the reclining portion 50, and controls display of the display 23. Namely, the CPU 100A reads a control program from the ROM 100B or the storage 100D based on signals from the seat slide portion 40, executes the control program using the RAM 100C as a work area, and controls display of the display 23.

Figure 7:
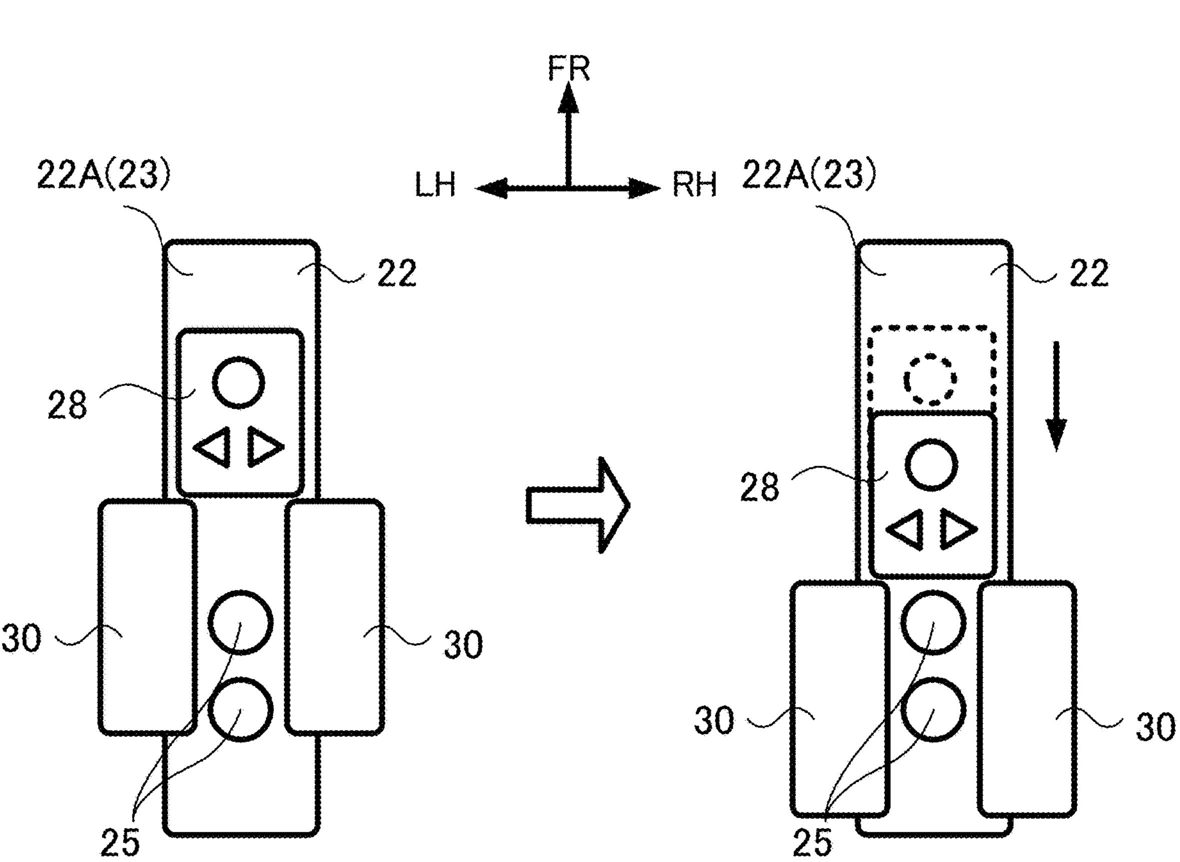
FIG. 7 is a plan view illustrating a change in a display position of an operation portion at a display.

Specifically, as an example, suppose that the vehicle seat 12 is moved from the seat position in the driving posture during manual driving which is illustrated in the left diagram in FIG. 7 to the seat position in the relaxed posture which is illustrated in the right diagram in FIG. 7, in which the vehicle seat 12 has been slid toward the vehicle rear side by the seat slide portion 40. Here, in the present exemplary embodiment, since the armrest 30 is integrally formed with the seat cushion 12A, when the vehicle seat 12 is slid, the armrest 30 is also slid by the same movement amount.

In such a case, the control section 100 derives the slide amount based on the electrical signal corresponding to the slide amount of the vehicle seat 12 output from the seat slide portion 40. The control section 100 then causes the display position of the operation portion 28 at the display 23 to move toward the vehicle rear side by the same amount as the derived slide amount, as illustrated in the right diagram in FIG. 7.

Conversely, suppose that the vehicle seat 12 is moved from the seat position in the relaxed posture illustrated in the right diagram in FIG. 7 to the seat position in the driving posture during manual driving illustrated in the left diagram in FIG. 7, in which the vehicle seat 12 has been slid toward the vehicle front side by the seat slide portion 40. Similarly, in such a case, the control section 100 derives the slide amount based on the electric signal corresponding to the slide amount of the vehicle seat 12 output from the seat slide portion 40, and causes the display position of the operation portion 28 at the display 23 to move toward the vehicle front side by the same amount as the derived slide amount, as illustrated in the left diagram of FIG. 7.

In this manner, the control section 100 causes the display position of the operation portion 28 at the display 23 to change following the change in the seat position of the vehicle seat 12.

Figure 8:
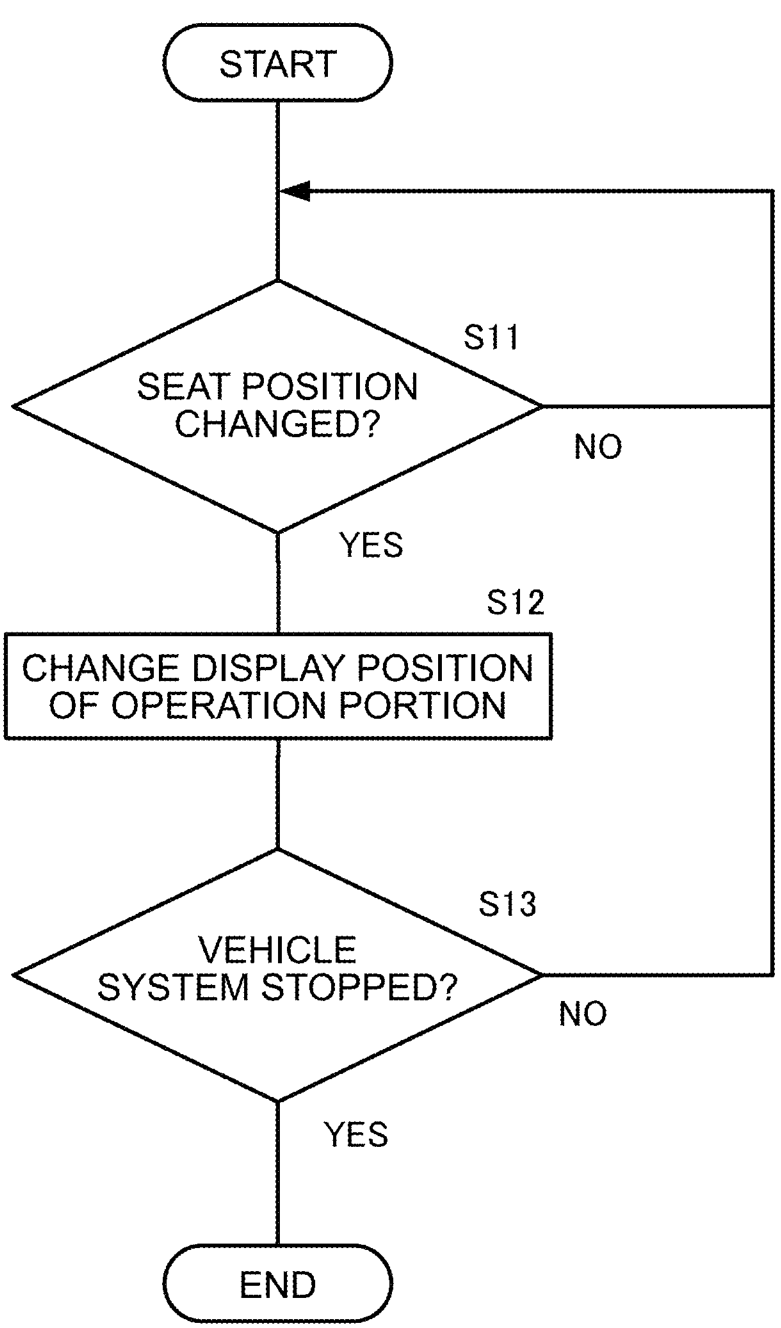
FIG. 8 is a flowchart illustrating a series of processes performed by a control section of a vehicle system according to an exemplary embodiment of the present disclosure.

Next, explanation follows regarding a flow of display control processing by the control section 100 of the vehicle system 10, with reference to the flowchart in FIG. 8. In the vehicle system 10 according to the present exemplary embodiment, as illustrated in FIG. 8, at step S11, the control section 100 determines, based on an output signal from the seat slide portion 40, whether or not the seat position of the vehicle seat 12 has been changed.

In a case in which it is determined at step S11 that the seat position has been changed (step S11; YES), at step S12, the control section 100 causes the display position of the operation portion 28 at the display 23 to change by the same amount as the slide amount of the vehicle seat 12, in the manner described above.

Next, at step S13, the control section 100 determines whether or not the vehicle system 10 has been stopped. Specifically, as an example, the control section 100 determines that the vehicle system 10 has been stopped, such as in a case in which the engine of the vehicle 10A has been stopped, or the like.

In a case in which it is determined at step S13 that the vehicle system 10 has been stopped (step S13; YES), the control section 100 ends all processing.

On the other hand, in a case in which it is determined at step S11 that the seat position has not been changed (step S11; NO), or in a case in which it is determined at step S13 that the vehicle system 10 has not been stopped (step S13; NO), the control section 100 transitions to the processing of step S11, and performs the processing of step S11 onwards.

Operational Effects

Explanation follows regarding operational effects of the present exemplary embodiment.

In the vehicle system 10 according to the present exemplary embodiment, the control section 100 serving as a display control section causes display of the operation portion 28, which is capable of operating vehicle electronic devices, at the display 23 that is provided at the upper face 22A of the center console 22, and causes the display position of the operation portion 28 to change following a change in the seat position of the vehicle seat 12. Therefore, even if the seat position of the vehicle seat 12 is changed, since the display position of the operation portion 28 at the display 23 is changed in accordance with the change, a seated occupant can operate the operation portion 28 displayed at the display 23, regardless of the seat position of the vehicle seat 12.

Further, in the vehicle system 10 according to the present exemplary embodiment, since the seat position is changed due to a change in the seat location in the vehicle front-rear direction of the vehicle seat 12, in a case in which the seat location in the vehicle front-rear direction of the vehicle seat 12 has been changed, the display position of the operation portion 28 at the display 23 can be changed in accordance with the change in the seat location.

Furthermore, in the vehicle system 10 according to the present exemplary embodiment, since the display 23 is provided at an entirety of the upper face 22A of the center console 22, the movement amount of the display position of the operation portion 28 at the display 23 can be increased, and a larger change in the seat position can be accommodated.

In addition, in the vehicle system 10 according to the present exemplary embodiment, since the operation portion 28 is arranged, at the upper face 22A of the center console 22, at a position at which the operation portion 28 is operable by the finger F of the occupant in a state in which the occupant places his/her arm on the armrest 30, the occupant can operate the operation portion 28 in a state in which his/her arm is placed on the armrest 30.

Supplementary Notes Regarding the Present Exemplary Embodiment

In the above-described exemplary embodiment, the display 23 is provided at an entirety of the upper face 22A of the center console 22; however, the present disclosure is not limited thereto. For example, the display 23 may be provided at a vehicle front side or a vehicle rear side of the upper face 22A of the center console 22. In such a case, the cup holders 25, a container 26, and the like may be provided at an area at which the display 23 is not provided at the upper face 22A of the center console 22.

Further, in the above-described exemplary embodiment, the armrest 30 is integrally formed with the seat cushion 12A; however, the present disclosure is not limited thereto, and the armrest 30 may be formed separately. In such a case, the armrest 30 and the seat cushion 12A are coupled by a known fastening method. In addition, the armrest 30 may be connected to the seatback 12B instead of the seat cushion 12A, or the armrest 30 may be independent of either the seat cushion 12A or the seatback 12B without being connected to either. Note that in the vehicle system 10 of the present exemplary embodiment, the armrest 30 need not be provided.

Note that in a case in which the armrest 30 is connected to the seatback 12B, the control section 100 derives the sliding amount of the armrest 30 based on an electrical signal corresponding to the rotation angle (posture) of the seatback 12B output from the reclining portion 50. Specifically, the position of the armrest 30 with respect to the rotation angle (posture) of the seatback 12B is detected in advance, and the sliding amount of the position of the armrest 30 is derived based on the amount of change in the posture of the seatback 12B. The control section 100 then causes the display position of the operation portion 28 at the display portion 23 to change in accordance with the derived slide amount.

In this manner, in a case in which the seat position is changed due to a change in the seat posture, the display position of the operation portion 28 at the display 23 can be changed in accordance with the change in the seat posture when the seat posture of the vehicle seat 12 has been changed.

Although an exemplary embodiment of the present disclosure has been explained above, the present disclosure is not limited to the above descriptions, and obviously various other modifications may the implemented within a range that does not depart from the gist of the present disclosure.

What is claimed is:

1. A vehicle system, comprising:

a vehicle seat having a seat position that is changeable;

a center console that extends in a vehicle front-rear direction;

a display that is provided at an upper face of the center console, the display including a first display region and a second display region located forward or rearward of the first display region;

a memory; and a processor that is coupled to the memory, the processor being configured to:

cause display, at the first display region of the display, of an operation window that is configured to operate a vehicle electrical hardware; and change a display position of the operation window from the first display region to the second display region of the display to follow a change in the seat position by a same amount as a movement amount of the vehicle seat.

2. The vehicle system according to claim 1, wherein the seat position is configured to be changed due to a change in a seat location in the vehicle front-rear direction.

3. The vehicle system according to claim 1, wherein the seat position is configured to be changed due to a change in a seat posture.

4. The vehicle system according to claim 1, wherein the display is provided at an entirety of the upper face of the center console.

5. The vehicle system according to claim 1, wherein:

the vehicle seat comprises an armrest; and the operation window is arranged, at the upper face of the center console, at a position at which the operation window is operable by a finger of an occupant in a state in which an arm of the occupant is placed on the armrest.

6. The vehicle system according to claim 5, wherein:

the armrest is configured to move in the vehicle front-rear direction in accordance with the change in the seat position; and the processor is configured to set a change amount of the display position of the operation window from the first display region to the second display region in the vehicle front-rear direction based on a movement amount of the armrest in the vehicle front-rear direction which accompanies the change in the seat position.

7. The vehicle system according to claim 6, wherein the processor is configured to set the change amount of the display position of the operation window in the vehicle front-rear direction same as the movement amount of the armrest in the vehicle front-rear direction.

* * * * *